US010336301B2

(12) United States Patent
Gaucher et al.

(10) Patent No.: US 10,336,301 B2
(45) Date of Patent: Jul. 2, 2019

(54) DEVICE FOR WIPING A WINDOW OF A MOTOR VEHICLE

(71) Applicant: Valeo Systèmes d'Essuyage, Le Mesnil Saint Denis (FR)

(72) Inventors: Vincent Gaucher, Issoire (FR); Stéphane Houssat, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/573,390

(22) PCT Filed: Mar. 31, 2016

(86) PCT No.: PCT/EP2016/057132
§ 371 (c)(1),
(2) Date: Nov. 10, 2017

(87) PCT Pub. No.: WO2016/180572
PCT Pub. Date: Nov. 17, 2016

(65) Prior Publication Data
US 2018/0134256 A1 May 17, 2018

(30) Foreign Application Priority Data
May 13, 2015 (FR) .................................... 15 54310

(51) Int. Cl.
*B60S 1/18* (2006.01)
*B60S 1/26* (2006.01)
(Continued)

(52) U.S. Cl.
CPC ............... *B60S 1/3402* (2013.01); *B60S 1/26* (2013.01); *B60S 1/3418* (2013.01); *B60S 1/365* (2013.01); *B60S 1/583* (2013.01); *B60S 1/18* (2013.01)

(58) Field of Classification Search
CPC ...... B60S 1/3402; B60S 1/365; B60S 1/3418; B60S 1/3404; B60S 1/583; B60S 1/18; B60S 1/26
(Continued)

(56) References Cited

U.S. PATENT DOCUMENTS 1,345,330 A * 6/1920 Shea .......................... B60S 1/08
15/250.29
1,561,320 A * 11/1925 Glidric ...................... B60S 1/08
15/250.29
(Continued)

FOREIGN PATENT DOCUMENTS

DE 103 05 904 A1 8/2004
DE 10 2010 054150 A1 6/2012
(Continued)

OTHER PUBLICATIONS

International Search Report of the International Searching Authority issued in PCT/EP2016/057132 dated Jun. 30, 2016 (3 pages).
(Continued)

*Primary Examiner* — Gary K. Graham
(74) *Attorney, Agent, or Firm* — Osha Liang LLP

(57) ABSTRACT

The invention relates to a device (2) for wiping a window of a motor vehicle, comprising a wiper blade (4) rotated by a drive shaft (6) which is arranged at the output of a motor assembly (8) capable of creating an alternating rotational movement of said drive shaft. The wiping device also comprises means for translating the motor assembly, and some of said drive means are supported by the drive shaft. In this way, it is the rotation of the drive shaft that translates the motor assembly. The invention also relates to a motor vehicle comprising such a wiping device and to a structural element, in particular a boot door, to which the device is attached.

13 Claims, 2 Drawing Sheets

(51) Int. Cl.
*B60S 1/34* (2006.01)
*B60S 1/36* (2006.01)
*B60S 1/58* (2006.01)

(58) Field of Classification Search
USPC .... 15/250.3, 250.21, 250.23, 250.29, 250.22
See application file for complete search history.

(56) References Cited

U.S. PATENT DOCUMENTS

| | | | | |
|---|---|---|---|---|
| 2,392,230 | A * | 1/1946 | Collins | B60S 1/08 |
| | | | | 15/250.17 |
| 2,875,464 | A * | 3/1959 | Collins | B60S 1/08 |
| | | | | 15/250.13 |
| 9,023,153 | B2 * | 5/2015 | De Smet | B60S 1/22 |
| | | | | 134/6 |
| 2014/0215745 | A1 | 8/2014 | Baasch et al. | |

FOREIGN PATENT DOCUMENTS

| | | |
|---|---|---|
| EP | 1 164 064 A2 | 12/2001 |
| FR | 2 890 024 A1 | 3/2007 |
| FR | 2 994 915 A1 | 3/2014 |
| JP | 61-282151 * | 12/1986 |

OTHER PUBLICATIONS

Written Opinion of the International Searching Authority issued in PCT/EP2016/057132 dated Jun. 30, 2016 (5 pages).

* cited by examiner

DEVICE FOR WIPING A WINDOW OF A MOTOR VEHICLE

The present invention deals with the field of wiping, and more particularly the wiping of a motor vehicle window by a wiper blade whose sweep movement is controlled by a rotary drive shaft.

Wiper blades are known that are mounted at the end of a wiper arm that is secured to a shaft driven in rotation by a motor assembly, such that the zone of the window wiped by the blade exhibits a regular circular form, of a radius corresponding to the length of the wiper blade. This regular form is particularly advantageous when several blades are provided operating in parallel on one and the same window, as is in particular the case in front vehicle windshields. However, in the case of the wiping of a rear window it is common practice to provide only a single blade, and it can be advantageous to enlarge the wiping zone.

In this context, the invention proposes a device for wiping a motor vehicle window, comprising a wiper blade driven by the rotation of a drive shaft arranged at the output of a motor assembly suitable for creating an alternating rotational movement of said drive shaft. According to a feature of the invention, the wiping device also comprises means for driving said motor assembly in translation and the drive shaft bears a part of these driving means. In this way, it is the rotation of the drive shaft which creates a translation of the motor assembly.

Thus, the wiping zone is no longer defined by a circular trajectory of the wiper blade, as previously defined in the prior art, but by an elliptical trajectory, the center of rotation of the blade moving along a longitudinal axis. The sweep zone is thus increased, while retaining an architecture with a single wiper blade.

According to an advantageous feature of the invention, the translational driving means are formed by the combination of means for transforming a rotational movement into a translational movement, and translational guiding means.

In a preferred embodiment of the invention, the means for transforming a rotational movement into a translational movement are formed by a pinion-rack assembly, in particular with straight teeth. The drive shaft bears the pinion, whereas the rack is fixed relative to the window to be wiped. The pinion and the rack are continually engaged, such that there are no jerks in the translational movement of the motor assembly, and that the sweep performed by the wiping device is regular.

According to a feature of the invention in its preferred embodiment, the rack is formed on a plate arranged transversely to the drive shaft. The rack can be formed on an edge of this plate to cooperate with the pinion borne by the drive shaft.

In a preferred embodiment of the invention, the translational guiding means comprise a carriage secured to the motor assembly which is suitable for sliding along a rail, transversely to the axis of rotation of the drive shaft. Advantageously, the plate can bear this rail, at the top of the rack. It will be understood that this arrangement, in which the plate bears a part of the means for transforming the rotation of the drive shaft into the translation of the motor assembly and a part of the translational guiding means, simplifies the mounting of the device. It is important for the means for transforming the rotation of the drive shaft into translation of the motor assembly and the translational guiding means to be correctly arranged relative to one another for them to be able to cooperate when the motor is running, and the fact that the plate bears a part of each of these means limits the mounting plays.

In different variant embodiments, it will be possible to provide for performing the alternating rotational movement of the drive shaft either by an alternating motor assembly, or by the combination of a continually rotating motor assembly and a mechanical device, in particular arranged between the drive shaft and the motor assembly, which creates this alternation.

The invention relates also to a structural element of a motor vehicle, comprising a window suitable for being wiped by the device. The structural element comprises a hole through which the drive shaft can pass to be, on one side of the structural element, engaged with the wiper blade of the window and to be, on the other side of the structural element, engaged with the motor assembly. According to a feature of the invention, the hole has an oblong form of axis parallel to the direction of sliding of the motor assembly.

Thus, the drive shaft can follow the sliding of the motor assembly and it can continue to perform its function of rotational driving of the wiper blade whatever the longitudinal position of the motor assembly.

The invention relates also to a motor vehicle comprising a wiping device as described previously.

Other features and advantages of the invention will become apparent on reading the following detailed description of an embodiment, for an understanding of which reference will be made to the attached figures in which.

Figure 1:
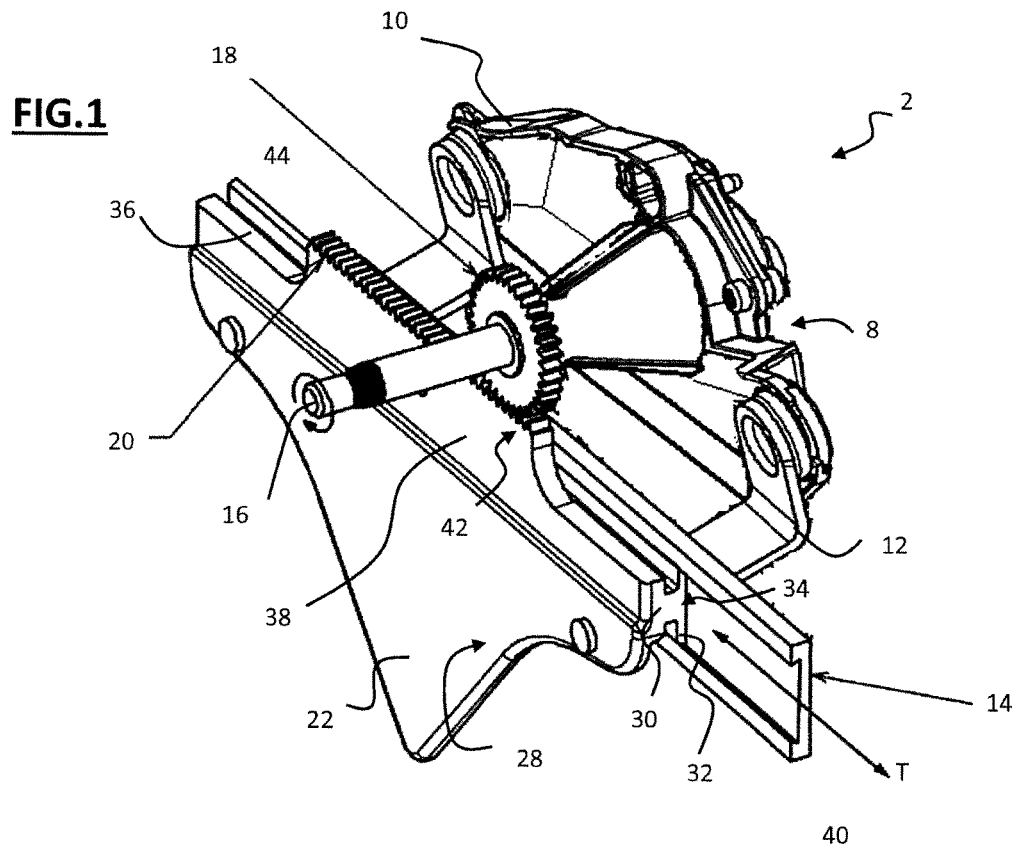
FIG. 1 is a perspective view of a window wiping device according to the invention, in which can be seen in particular a plate, a rail and a carriage forming translational guiding means, a motor assembly and pinion and rack means allowing the transformation of a rotational movement into a translational movement.
Figure 4:
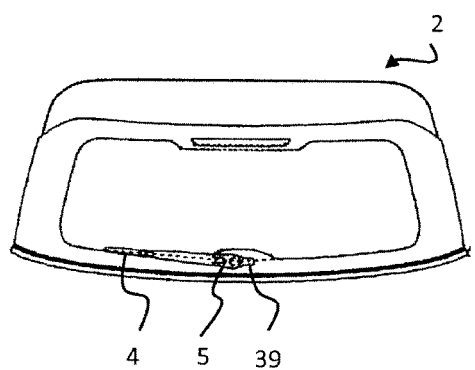
FIG. 4 is a front view representing a drive shaft, the wiper arm and the wiper blade of the device according to FIG. 1 in said primary position.
Figure 5:
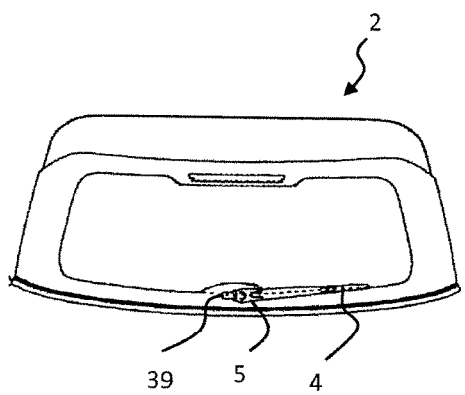
FIG. 5 is a view similar to FIG. 4, the drive shaft, the wiper arm and the wiper blade being here in said secondary position.

A window wiping device 2 comprises a wiper blade 4 (visible in FIG. 4, 5 or 6) mounted on a wiper arm 5 which is secured to a drive shaft 6, arranged in the extension of the motor shaft, at the output of the associated motor assembly 8, as is more visible in FIG. 1.

The drive shaft is driven in rotation by the motor assembly. Advantageously, the rotational movement transmitted to the drive shaft, and therefore to the wiper blade borne by this shaft, is an alternating rotational movement, that is to say that it switches alternately from a first extreme position (visible in FIG. 4) to a second extreme position (visible in FIG. 5) by rotating in a given direction of rotation, then by rotating in the reverse direction of rotation. This alternated rotational movement makes it possible to thus perform the known reciprocating movement of the wiper blades. In a particular implementation of the invention, a continuously rotating motor is used, and a mechanical device is applied between the motor and the drive wheel which makes it possible to transform the continuous rotational movement into an alternating rotational movement.

According to the invention, means are provided for driving the motor assembly in translation, and therefore the drive shaft secured thereto.

The motor assembly 8 comprises mechanical means, here not represented, housed in a casing 10 which is fixed, via fixing brackets 12, onto a carriage 14. This carriage extends substantially in a plane transversal to the axis of rotation of the drive shaft arranged at the output of the motor assembly.

The drive shaft 6 extends along a longitudinal axis, and it has a proximal end secured to the motor of the motor assembly, and a distal end 16 secured to the wiper blade.

Figure 2:
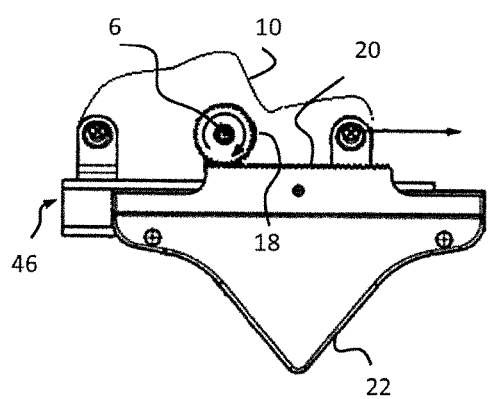
FIG. 2 is a front view of the device of FIG. 1 according to a so-called primary position of the device, in which the motor assembly is arranged at a first end of the rail secured to the plate.
Figure 3:
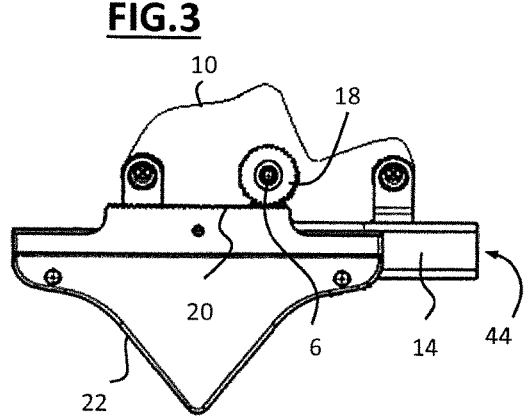
FIG. 3 is a front view of the device of FIG. 1 according to a so-called secondary position of the device, in which the motor assembly is arranged at a second end of the rail secured to the plate.

The drive shaft bears, on its perimeter, a fixed pinion 18, secured in rotation to the shaft. As can be seen in FIGS. 1 to 3, the pinion has straight teeth, and it is capable of being engaged with a rack 20, which will be detailed hereinbelow.

In the embodiment represented, the rack is borne by a plate 22, which is fixed onto a structural element 24 of the vehicle.

The plate is substantially flat and it can be dished to follow any curvature of the structural element. It has an inner face turned toward the motor assembly and an outer face 28 turned toward the structural element.

The plate comprises, on its inner face, a beam 30 which extends protruding from the plate, substantially in the form of a "T". The beam comprises two fins 32 which extend substantially parallel to the inner face of the plate, to form a guiding rail 34 in a direction transversal to the drive shaft, along the plate.

The plate comprises a top edge 36 of which the central part 38 is cleared vertically from the lateral parts. This central part of the top edge is machined to form the rack 20.

The rack is formed by notches machined on an edge of the plate, which extends according to an axis transversal to the longitudinal axis of the drive shaft. The rack notches have a pitch and dimensions corresponding to those of the teeth of the pinion. The rack is fixed relative to the window to be wiped by virtue of the fixing of the plate, which bears the rack, onto the structural element of the vehicle, which bears the window to be wiped.

The rack 20 and the pinion 18 here form means for transforming the rotation of the drive shaft into translation of the motor assembly, and therefore of the associated drive shaft.

These transformation means form the translational driving means, in particular when they are associated with means for guiding the motor assembly in translation. The rail 34, formed by the fins of the beam, is suitable for cooperating with the corresponding form of the carriage 14, such that the rail and the carriage, on which the motor assembly is fixed, form means for guiding the translation of the motor assembly.

It will be understood that, according to the invention, the plate 22 bears both a part of the means for transforming the rotation of the drive shaft into translation of the motor assembly, and a part of the means for guiding the motor assembly in translation.

The structural element 24 comprises a hole 39, through which the drive shaft can pass so as to be, on one side of the element, engaged with the wiper blade of the window and, on the other side of the structural element, engaged with the motor assembly borne by the plate secured to said structural element. The hole has an oblong form of axis parallel to the axis of the rack and to the direction of sliding of the motor assembly, for the drive shaft to be able to follow the sliding of the motor assembly from the primary position to the secondary position and vice versa.

It will be understood that, in the case of a rear window wiping device, the structural element onto which the plate is fixed is a trunk lid. However, any structural element could be suitable for fitting the wiping device provided it includes a window to be wiped.

The intention is to describe in more detail the operation of these transformation means and of these guiding means by describing the use of the wiping device in a motor vehicle.

The wiping device is mounted in a primary position illustrated in FIG. 2 and in which, on the one hand, the pinion and the rack are engaged, and, on the other hand, the carriage is arranged engaged on the rail. In this primary position, which corresponds to the first extreme position of the wiper blade illustrated in FIG. 4, the carriage 14 is positioned at a first end 40 of the rail 34 whereas the pinion is arranged at a first end of the rack 42.

When the wiper blades are activated, whether by a manual command from the user or by automatic detection means, a control instruction is sent to start up the motor. This results at the output in a rotational movement of the drive shaft 6 about a first axis in a first direction, which, in addition to the rotating of the wiper arm 5 and of the wiper blade 4 that it bears, generates a rotational movement in the same first direction of the pinion 18 secured to the drive shaft. The rotation of this pinion, engaged on the fixed rack, generates a movement of the pinion toward the second end 44 of the rack and therefore a translation, along a second axis at right angles to the first axis (in the direction of the arrow T illustrated in FIG. 2), of the drive shaft relative to this rack. The result thereof is a translational movement of the motor assembly, able to slide in the direction parallel to the axis of the rack by virtue of the cooperation of the translational guiding means, namely the carriage secured to the motor assembly, and the rail borne by the plate.

The translational movement of the assembly continues until the pinion is engaged on the rack at its second end (as can be seen in FIG. 3). In this secondary position, which corresponds to the second extreme position of the wiper blade illustrated in FIG. 5, the carriage is positioned at a second end of the rail 46.

In order to perform the reciprocating movement of the wiper blade, there is thus an alternate switch between the primary position and the secondary position, by virtue of the alternating rotation of the motor shaft. In passing from one to the other of these positions, the wiper blade rotates about its axis and this axis moves. There is a rotation of the blade which is simultaneous with its translational movement.

Figure 6:
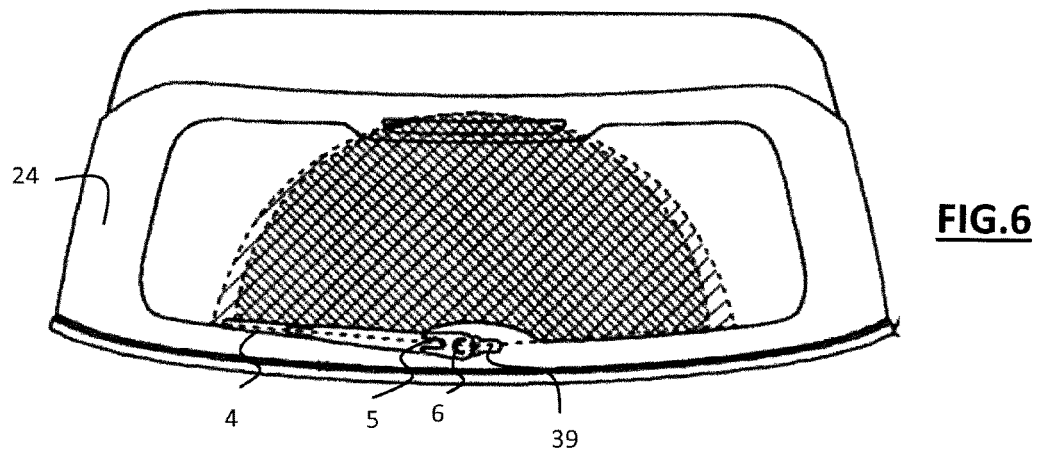
FIG. 6 is a schematic representation of the sweep zone covered by a wiping device according to the invention, compared to the sweep zone conventionally produced.

It can be seen, in particular in FIG. 6, that the center of rotation of the trajectory of the wiper blade moves along a rectilinear axis, such that the trajectory defined by the wiper blade is elliptical, and it can be observed that the wiping device according to the invention allows a better coverage of the window to be wiped than if the center of rotation were to remain fixed.

The description above explains clearly how the invention makes it possible to achieve the objectives set for it and in particular to propose a window wiping device which offers a greater wiping surface without necessitating an increase in the number of wiper blades for this.

Obviously, various modifications can be made by those skilled in the art to the structures of the window wiping device, which have just been described as nonlimiting examples. By way of example, in a variant not represented, it will be possible to provide for the rack and the guiding rail to be borne by distinct parts, or for them to be formed directly on the structural element of the motor vehicle.

The invention claimed is:

1. A device for wiping a window of a motor vehicle, comprising:
   a wiper arm, including a wiper blade, attached to a drive shaft arranged at the output of a motor assembly for creating an alternating rotational movement of said drive shaft; and
   means for driving said motor assembly in translation, a part of said driving means being borne by said drive shaft,
   wherein said drive shaft rotates said wiper arm about a first axis of the drive shaft.

2. The device as claimed in claim 1, wherein said translational driving means comprise means for transforming a rotational movement of the drive shaft about the first axis into a translational movement of this drive shaft along a second axis at right angles to said first axis.

3. The device as claimed in claim 2, wherein the transformation means comprise a pinion and a rack, the drive shaft bearing said pinion.

4. The device as claimed in claim 3, wherein the pinion and the rack have straight teeth.

5. The device as claimed in claim 3, wherein the rack is formed on a plate arranged transversely to the drive shaft.

6. The device as claimed in claim 5, wherein the rack is formed on an edge of said plate to cooperate with the pinion borne by the drive shaft.

7. The device as claimed in claim 2, wherein said translational driving means further comprise means for guiding the motor assembly in translation.

8. The device as claimed in claim 7, wherein the translational guiding means comprise a rail and a carriage, said carriage being secured to the motor assembly and being capable of sliding along said rail, transversely to the first axis of rotation of the drive shaft.

9. The device as claimed in claim 8, wherein the transformation means comprise a pinion borne by the drive shaft and a rack formed on a plate arranged transversely to the drive shaft, and wherein said plate bears said rail.

10. The device as claimed in claim 9, wherein the plate is fixed onto a structural element bearing the window to be wiped.

11. The device as claimed in claim 1, wherein the alternating rotational movement of the drive shaft is performed by a continuously rotating motor assembly and by a mechanical device, which creates this alternation.

12. A structural element of a motor vehicle comprising:
    a window;
    the wiping device as claimed in claim 1; and
    a hole through which the drive shaft passes to be on one side of the structural element attached to the wiper arm and to be on another side of the structural element engaged with the motor assembly borne by a plate secured to said structural element, wherein
    the hole has an oblong form of axis that is parallel to the direction of sliding of the motor assembly.

13. The structural element of the motor vehicle as claimed in claim 12, wherein the structural element is a trunk lid.

* * * * *